Sept. 29, 1970   J. W. SARGENT   3,531,751
DYNAMOELECTRIC MACHINE COIL AND METHOD OF MAKING SAME
Filed Dec. 16, 1968
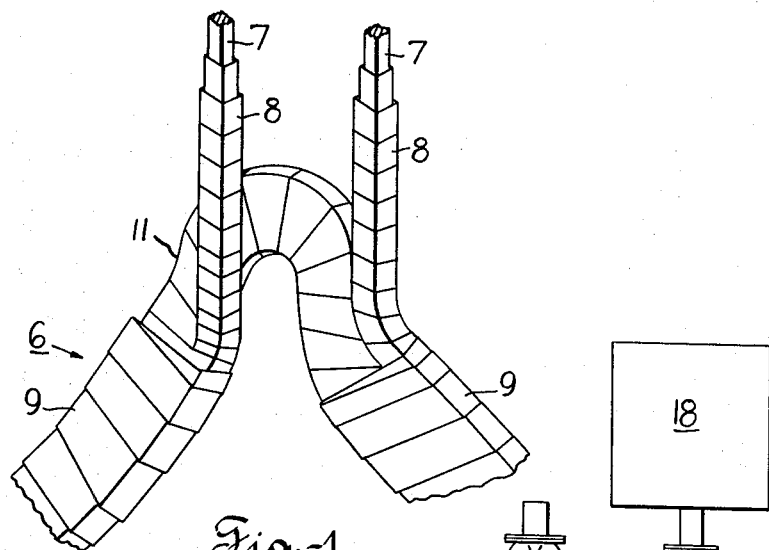
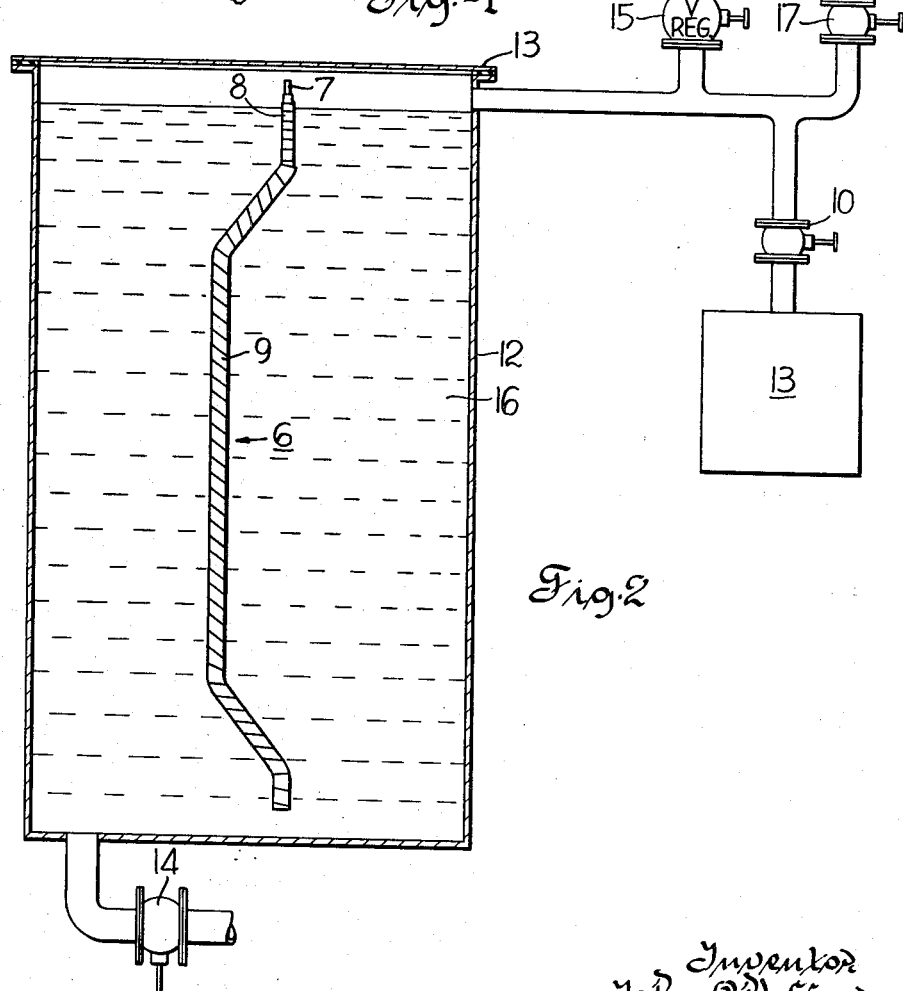
Inventor
John W. Sargent
by John C Hines
Attorney United States Patent Office 3,531,751
Patented Sept. 29, 1970

3,531,751
DYNAMOELECTRIC MACHINE COIL AND
METHOD OF MAKING SAME
John W. Sargent, New Berlin, Wis., assignor to Allis-Chalmers Manufacturing Company, Milwaukee, Wis.
Filed Dec. 16, 1968, Ser. No. 783,962
Int. Cl. H01f 27/32
U.S. Cl. 336—209    4 Claims

ABSTRACT OF THE DISCLOSURE

A dynamoelectric machine coil having conventional ground insulation thereon. An additional layer of an armor insulation is placed about the ground insulation leaving an uncovered area exposing the ground insulation. This uncovered area can be considered a mouth providing access to the space between the ground and armor insulation. The armor insulation is impervious to liquid at atmospheric pressure such that liquid can enter the mouth forcing gas out through the mouth trapping the liquid between the ground and armor insulation.

---

This invention pertains to a dynamoelectric machine coil and the method of producing such a coil.

One of the accepted methods for producing dynamoelectric machine coils is according to the vacuum pressure impregnation or VPI system. The coils are first covered with a ground insulation such as mica tape with sufficient layers to provide adequate insulation for the application of the dynamoelectric machine. An outer armor covering or tape is usually applied about the ground insulation. The wrapped coils or the coil assembly such as the stator may then be placed in an oven which is heated to remove vapor which might be trapped in the insulation. After sufficient heating the coil is placed in a vacuum tank and a vacuum is drawn. A resin is admitted into the tank submerging the coil. In some instances, pressure is then applied to the tank by means of an inert dry gas in order to drive the resin into the voids in the groun tape. After the coil is exposed to atmospheric pressure, the resin is removed from the tank. The coil is then removed and the resin in the insulation is cured.

This general type of VPI system does provide a coil which is acceptable for many applications. However, two drawbacks of such a system are that it is difficult to insure that the resin fills all of the voids in the tape, and when the coil is removed from the tank, the resin flows from the coil resulting in additional voids in the ground insulation and an uneven coating about the coil. It is well-known in the art that voids or moisture in the insulation covering of an electric coil can result in corona action which decomposes the insulation. Furthermore, because the coil must be positioned into slots of a predetermined size in the dynamoelectric machine, the resin filling and coating should be maintained relatively uniform to insure proper size and exterior coating of the finished coil. It is also known that better heat dissipation results when the outer coil surface is reasonably uniform.

It is applicant's intention and a general object of this invention to provide a method for insulating a coil which insures a high degree of penetration of the resin into the voids in the insulation and which eliminates running of the resin from within the insulation when the coil is dried.

A further object of the invention is to provide a method of the hereinbefore described type wherein a liquid impervious, gas pervious insulation is applied about the ground insulation of the coil, however, providing an opening to the space between the inner and outer insulations for the admission of an insulating liquid.

An additional object of this invention is to provide a coil having an inner ground insulation completely enclosing the coil and an outer armor insulation about the ground insulation except for at least one opening into the space between the two insulations.

These and other objects of the subject invention will become more fully apparent as the following description is read in light of the attached drawing wherein, FIG. 1 shows a portion of a coil having an insulation wrapping according to the invention, and FIG. 2 is a schematic drawing showing a coil wrapped in accordance with the subject invention submerged in a resin-filled tank.

Referring to the drawing, a dynamoelectric machine coil generally designated 6 is composed of a plurality of individual conductors 7. It is well-known in the art that the coil is constructed by winding the conductor into a plurality of loops. The loops are held together in any conventional manner and then bent into the shape desired for insertion into slots in a dynamoelectric machine (not shown).

The coil is then usually wrapped including the leads 7 with one or more layers of a ground insulation as for instance, mica tape 8. Any well-known type of mica tape is acceptable for this purpose such as 3M Company MX–2301 mica webb tape. After the required number of layers of mica tape, depending on the ultimate application of the machine, have been wrapped about the coil an additional covering such as, for instance, a layer of armor tape 9 is applied about the mica tape 8. A single layer of armor tape has been found to be acceptable for purposes of this invention. The armor tape 9 is of a type which is impervious to liquid at atmospheric pressure and as will be more fully explained later, may be pervious to gas at atmospheric pressure or less. Any tape having these characteristics may be used for the armor tape layer. A tape such as E. I. duPont deNemours & Company No. 6111–C "Lecton" resin coated glass tape, is acceptable for this application.

As shown in FIG. 1 a portion of the coil is not covered by the armor tape 9. This portion may be referred to as a mouth and is generally designated 11. Although as shown herein for purposes of illustration, the mouth 11 is in the vicinity of the leads 7, it should be understood that the mouth may be formed at any point on the coil. After the coil is wrapped, it may be placed in an oven or other means for heating the coil (not shown) to drive off moisture in the insulation. As an example, it has been found that if the coil is placed in a hot air circulation oven for a period of two hours at a temperature of between 100° to 150° C., sufficient moisture will be eliminated. In some instances this heating step may be eliminated if it is found that the vacuum step removes the moisture to a sufficient degree.

After the mica tape 8 and the armor tape 9 have been applied to the coil 6 and the coil is heated, it is inserted in a tank 12. The coil must be placed in the tank 12 in a manner so that the mouth 11 is at the highest point on the coil except when the mouth is in the vicinity of the leads 7, the leads may extend above the level of the mouth. The lid 13 of the tank 12 is then applied completely sealing the tank.

A vacuum is then created in the tank 12 by opening the valve 10 and activating a vacuum pump indicated schematically at 13. The vacuum removes most of the gas in the voids in the insulation and between the insulation layers. After the tank has been evacuated to a pressure of approximately 1.0 mm. or less for a total of approximately 45 minutes, the valve 10 is closed and valve 14 is opened permitting resin to enter the tank 12. The resin is maintained in a reservoir (not shown) and a pump (not shown) may be utilized to force the resin into the tank. The resin utilized may be any conventional type having the necessary dielectric properties for the purpose for which the coil is intended. We have found that Sterling Varnish Company epoxy impregnating resin Y-812 is a resin which will adequately satisfy the purposes of this invention for class F (155° C.) insulation.

The resin is admitted into the tank so that it is at a level at least above the mouth 11 in the coil. The vacuum is maintained at 1.0 mm. or less for a period of approximately 60 minutes from the time of opening the resin transfer valve 14. While under the vacuum the resin in the tank 12 will flow into the space between the armor tape 9 and the mica tape 8 through the coil mouth 11 filling the voids. Gas bubbles will be apparent as the resin flows into this space forcing the gas through the gas porous wrapping 9 and through the mouth 11.

While it is preferred that an insulation which is porous to gas at atmopheric pressure or less such as the above-identified "Lecton" tape be used as the armor wrapping, this is not absolutely necessary as the gas will be forced out the mouth 11 by the resin. The resin evidently fills minute gas pockets which were not evacuated during the vacuum step.

While the coil is under vacuum the outer armor wrapping 9 has a tendency to pull away from the inner mica wrapping thereby insuring that the liquid resin will flow into the space between the two wrappings through the mouth 11. Although it is not critical to the invention the outer wraping 9 may be porous to both liquid and gas under the effect of the vacuum. Whether or not the wrapping 11 is porous to liquid under the vacuum condition the resin 16 will flow into the space between the inner and outer wrappings filling all voids therein and in the insulation wrappings and forcing all gas which was not evacuated through the outer wrapipng 9 and out the mouth 11.

After the vacuum has been held for a sufficient period of time, as for instance, 60 minutes from the time of opening the resin transfer valve 14, the vacuum is broken to atmospheric pressure. This may be accomplished in any conventional manner such as by opening valve 15 which permits air to enter the tank 12 at a controlled rate. The coil 6 is maintained in the tank 12 at atmospheric pressure for a sufficient period of time, such as, for instance, 60 minutes. During this time the pressure of the liquid acting on the mouth 11 of the coil will continue to force any gas which might remain in the coil through the outer wrapping 9 and mouth 11. However, under atmospheric conditions the outer wrapping 9 is nonporous to liquid thereby retaining the liquid within the outer wrapping.

In certain instances depending on the insulation requirements of the coil, an additional step may be provided in the method of insulating the coil. After the coil has been held at atmospheric pressure submerged in the resin in the tank 12, a pressurized gas such as inert dry nitrogen may be admitted to the tank 12 through the valve 17. The pressurized nitrogen gas may be supplied from a tank shown schematically as 18. The nitrogen pressure may be maintained anywhere between 15 and 95 pounds per square inch for a period of approximately 60 minutes from the time of turning on the nitrogen supply. If the pressurizing step is utilized it is desirable to include an additional vacuum step after breaking the pressure from the tank. The gas pressure is removed from the tank by closing gas admission valve 17 and opening the gas discharge valve 10. This permits the gas to be removed from the tank by the vacuum pump 13. After the nitrogen gas has been removed an additional vacuum of 1.0 mm. or less may be held for a period of 45 minutes.

After the vacuum has been held for a period of 45 minutes, the vacuum is broken by opening the valve 15 and the resin 16 is drained from the tank 12 by opening the resin transfer valve 14. The coil is maintained in the tank under atmospheric pressure with the resin removed for a sufficient period to permit the excess resin on the outer portion of the wrapping 9 to drain. Since this outer wrapping 9 is nonporous to liquid at atmospheric pressure, the resin within the outer wrapping 9 will not drain. After a sufficient draining time, as for example, 30 minutes, the coil is removed from the tank 12 and placed in a suitable curing oven (not shown).

It is important that the coil is maintained in a position so that the mouth 11 on the coil is always at the highest point of the coil so that the resin in the space between the inner and outer wrapping will not drain therefrom. With the coil maintained in the vertical position with the mouth 11 up, the coil is heated for a sufficient period of time to cure the resin which is utilized. A satisfactory curing time for a typical resin is for a period of 8 hours at a temperature of 150 to 155° C.

From the above description it can be seen that with the mouth 11 of the coil 6 submerged in the resin, the resin will flow into the space between the inner and outer wrappings. Furthermore, since the outer wrapping 9 is nonporous to liquid at atmospheric pressure, the resin within the outer coil wrapping will not drain from the coil. This insures that all of the gas voids within the wrappings will be filled with resin and any gas that had previously been trapped in the coil prior to submersion in the resin will be forced through the outer gas porous wrapping 9 and the mouth 11. An additional advantage is that resin does not drain from within the outer wrapping while the coil is being heated to cure the resin insuring a more uniform outer coil surface.

It should be understood that while the invention has been shown in connection with the insulation of a single coil, the wrapped coils could be attached to, for instance, a motor stator and the whole stator then placed in the tank 12. With the stator placed in the tank with the coil mouths 11 facing upward, the impregnation steps would be the same as set forth above.

Although only one embodiment of the subject invention has been herein shown and described, other embodiments will be apparent to those skilled in the art after reading this description and it is intended that all such embodiments as come within a reasonable interpretation of the intended claims be covered.

The embodiments of the invention in which an exclusive property or privilege is claimed are defined as follows:

1. A coil for an electrical apparatus comprising: a first covering of an electrical ground insulating material completely covering all of the exposed surfaces of said coil; a second protective covering having terminal ends placed about said first covering, said terminal ends being adjacent and spaced from one another thereby exposing therebetween a portion of said first covering and providing access to the space between said first and second coverings; and a solid electrically insulating material filling the voids between said first and second coverings.

2. The coil set forth in claim 1 wherein said second covering is impervious to liquid at atmospheric pressure.

3. The coil set forth in claim 2 wherein said second covering is prior to curing of said insulating material pervious to gas at atmospheric pressure.

4. The method of insulating an electric coil comprising the steps of:

(A) completely covering the exposed surfaces of said coil with an electrical ground insulation;

(B) covering said ground insulation with an outer protective covering having terminal ends adjacent to and spaced from one another thereby exposing therebetween a portion of said ground insulation and providing access to the space between said ground insulation and protective covering, said protective covering being nonpervious to liquid at atmospheric pressure;

(C) placing said coil in a tank with said exposed portion of said ground insulation disposed above the level of said protective covering;

(D) flooding said tank at least above the level of said terminal ends of said outer protective covering with an electrically insulating liquid which when cured will solidify;

(E) maintaining said coil submerged in said liquid to flow into the space between said ground insulation and said outer protective covering;

(F) removing said coil from said tank with said exposed portion disposed above the level of said protective covering; and (G) curing said coil with said exposed portion disposed above the level of said protective covering.

References Cited

UNITED STATES PATENTS

| | | | |
|---|---|---|---|
| 1,362,375 | 12/1920 | Unger | 336—209 X |
| 1,818,976 | 8/1931 | Goff | 336—209 X |
| 2,135,315 | 11/1938 | Walters | 336—209 |
| 2,656,290 | 10/1953 | Berberich | 336—205 X |
| 2,922,734 | 1/1960 | Kohn | 156—185 X |
| 2,928,964 | 3/1960 | Jones | 156—185 X |

ELLIOT A. GOLDBERG, Primary Examiner

U.S. Cl. X.R.

29—605; 156—56, 185; 310—208

PO-1050
(5/69)

UNITED STATES PATENT OFFICE
CERTIFICATE OF CORRECTION

Patent No. 3,531,751      Dated September 29, 1970

Inventor(s) John W. Sargent

It is certified that error appears in the above-identified patent and that said Letters Patent are hereby corrected as shown below:

Column 5, line 17, after "liquid" --- for a sufficient period of time to cause said liquid --- should be inserted.

SIGNED AND
SEALED
DEC 1 - 1970

(SEAL)
Attest:

Edward M. Fletcher, Jr.
Attesting Officer

WILLIAM E. SCHUYLER, JR.
Commissioner of Patents